Patented May 5, 1953

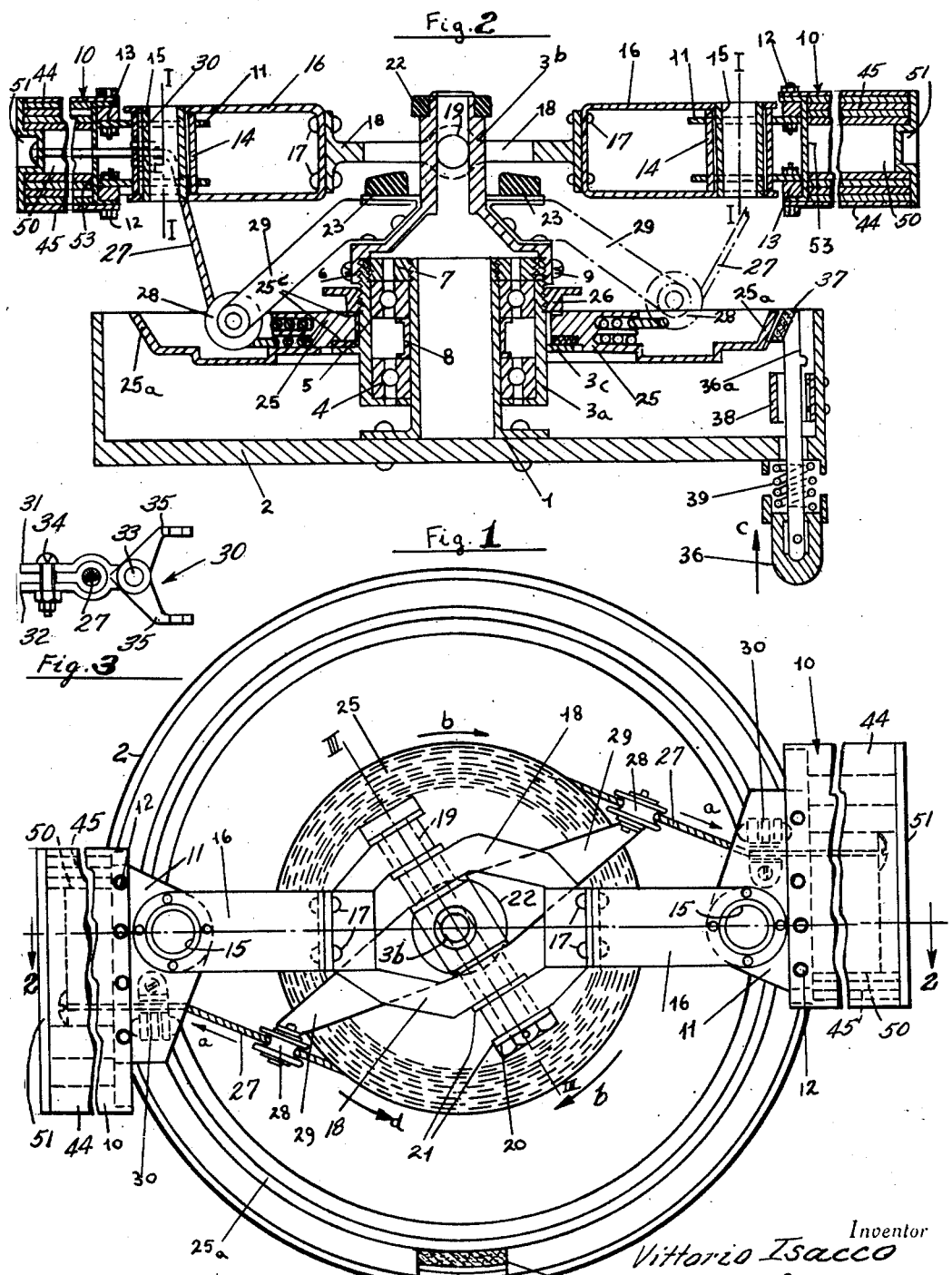

2,637,406

UNITED STATES PATENT OFFICE 2,637,406

TELESCOPIC ROTOR BLADES AND BRAKES THEREFOR

Vittorio Isacco, London, England

Application January 9, 1948, Serial No. 1,458
In Great Britain October 7, 1947

3 Claims. (Cl. 170—160.11)

This invention has reference to improvements in and relating to telescopic blades of rotors for parachutes and helicopters as has been described in the specification of my Patent No. 2,523,216.

According to the invention, there is provided a brake for the purpose of delaying the opening of the elements constituting each blade of the sustaining propeller or propellers. On account of practical necessities, a small play must be provided for the easy sliding movement of the elements when they extend outwards under the action of the centrifugal force, this giving way in practice to a rather fast opening of the blades, which fast opening has proved to be undesirable.

The present brake is unique for the blades of a rotor, and its pressure can be regulated before flight according to flight requirements.

The brake may be common to the blades or individual brakes may be provided for the blades. The common brake does not compensate for the differences in the sliding of the elements of one blade with respect to those of other blades and therefore it is desirable to provide the blades with individual brake devices in order to compensate for the differences of friction due to manufacturing inequalities; and if desired the individual brakes may be the sole braking means employed.

Another feature of the invention is that the same collective brake system can be utilized to retract all the blades at the same time when the speed of rotation is sufficiently low. This is effected by operating on a lever which acts as a brake between any part of the common brake and any part of the case or hub, or on any non-rotating part of the rotor.

In the accompanying drawings:

Fig. 1 is a top plan view of a propeller fitted with the general and individual brake devices in accordance with the present invention.

Fig. 2 is a cross-sectional view corresponding to line 2—2 of Figure 1.

Fig. 3 is an enlarged detail view of an individual brake device given as an example.

In Figs. 1 and 2, the central shaft 1 shown as tubular is stationary, being rigid with the non-rotating case or body 2. The rotor hub, composed of portions 3a, 3b and 3c, rotates freely around the shaft 1 by means of two ball-bearings 4 and 5. Nuts 6 and 7 and the spacer 8 hold the hub in position on the shaft 1. The main hub portion 3a is journalled on said bearings 4 and 5 and hub portion 3b comprises an upper extension rigidly secured to the upper end of the portion 3a by screws 9. The portion 3c comprises an annular flange extending radially from the portion 3a, as will be described hereinafter.

The rotor blades 10 are mounted on the upper hub portion 3b, two blades being shown as an example. These blades are of the telescopic type and are diagrammatically shown as including root elements 45, intermediate elements 44 and tip elements 50 which may be closed at their outer ends by flanged plugs 51. The root elements 44 are closed at their inner ends by bottom plates 53 against which the intermediate and tip elements abut when the blades are collapsed or retracted, as shown. These blades may be of the type shown in any aforementioned patents, particularly No. 2,523,216.

The root elements 45 are mounted on the hub portion 3b by means of bushings 14 carried by brackets 11 that are secured to the root elements by bolts 12 and spacers 13. Each bushing 14 is journalled on a hollow shaft 15 that is supported vertically on an axis I—I by a hollow fork 16, these axes I—I forming the hinging axis of the blades. The locking device which maintains the blades in this position, has already been described in the specification of my Patents Nos. 2,457,376, 2,458,855 and 2,523,216.

In the drawings, forks 16 are shown for simplicity, attached to the horizontal forks 18 by means of rivets 17. The horizontal forks 18 are inclined or extended angularly towards the leading edges of the blades as has been described in the aforementioned Patents 2,458,855 and 2,523,216. The horizontal forks 18 are hinged around a shaft 19 having a substantially horizontal axis III—III passing through the upper hub 3b. A nut 20 maintains the shaft 19 in position, antifriction rings 21 being provided between the ends of the forks 18.

The upper elastic stops 22 and the lower ones 23 are fitted on or around the upper hub part 3b, these stops limiting the upward and downward flapping movements of the blades as described in the aforementioned Patent No. 2,457,376.

The common brake which will delay the opening of the blades when subject to rotation by any means will now be described.

In the example shown, this brake is constituted by a pulley 25 capable of rotating around the lower hub 3a while bearing on the flange 3c of the said hub. A nut 26 is screwed onto the hub 3a and can exert a retarding pressure on the pulley 25 according to practical requirements.

Around pulley 25 are wound two flexible connecting elements such as cables 27 one for each of the blades shown, these cables being attached each at one end (the inner end) to the pulley 25 and each at the other end (the outer end) to the flanged plug 51 on the respective tip elements 50 of the blades.

From pulley 25 the cables 27 are trained around small pulleys 28 journalled on supports 29 which are rigid with the upper hub 3b. One of these supports 29, not visible in the cross section of Fig. 2, is indicated in phantom lines.

The whole of the system constituted by the blades, the hollow forks 16, the horizontal forks 18, the hub 3a, 3b, 3c, the pulley 25 and the nut 26, the pulleys 28, supports 29 and cables 27, constitute normally a single unit that rotates freely around the central shaft 1. However, a relative movement of the pulley 25 and the cables or wires 27 to the hub 3a, 3b, 3c, takes place when the blades are extended under the centrifugal force generated during rotation. That is to say, the outward movement of the elements acts on the wires 27 which in turn give the pulley 25 a relative movement of rotation in regard to the hub 3a. Pulley 25 must rotate in order for the blades to extend, and the speed of opening or extension of the blades will depend on the friction existing between the pulley 25 and the hub flange 3c.

The wires 27 are wound around pulley 25 in same directions, thus rotating the pulley 25 in the same direction as indicated by arrows b when the blades extend centrifugally.

Individual adjustable brakes 30 may be employed to cooperate with the wires 27 to equalize any difference in the sliding movements of two opposite blades and these brakes may either supplement or substitute for the common brake, if desired. They are, in the example indicated in the drawings, fitted inside the end bracket 11 of the blades. The wires 27 pass through these brakes 30 before passing inside the blade elements, to be finally attached to any part of the tips elements 50 of the blades.

The individual brake 30, given as an example, is shown on a larger scale in Fig. 3. The wire 27 passes between two appropriately bent plates or jaws 31 and 32, these plates being articulated at 33 to a support 35 fixed on both sides to the bracket 11. A screw 34 acts on the plates so as to exert the desired pressure on the wire 27, and thus brake its sliding movement when the blades are extended or retracted.

Thus by a convenient regulation of the individual brakes 30 the rate of simultaneous sliding movement of the elements of each blade can be made almost equal, and by regulating the common brake by pressure of the nut 26 and flange 3c against pulley 25 the speed of opening of all the blades can be achieved as desired. The individual brakes may be dispensed with if desired.

Figs. 1 and 2 show clearly how the blades can be made to retract when the speed of rotation of the rotor has sufficiently decreased after landing, and eventually how the body of the apparatus and the machine or man carried by the propeller can be made to rotate in the same direction as the propeller.

In the example, the pulley 25 is extended and ends in a conical surface 25a. A rod 36 36a, can be pushed upwards according to the arrow c in the example, so as to come into contact with the conical surface 25a of the pulley 25. The part 36a of the rod is fitted at its end with a friction segment 37. The rod 36 36a is guided by means of a bracket 38 fixed to the case 2. A spring 39 pushes the lever 36 downwards so as normally to hold the segment 37 away from the surface 25a.

Upward pressure on the rod 36 36a, will have the effect of retarding the speed of rotation of the pulley 25 with regard to that of the hub 3a and the blades giving way to a relative movement of rotation of the pulley 25 according to arrow d which is opposite to the relative movement during the opening of the blades. The result will be, that wires 27 will be pulled back in opposite direction to arrows a, and will be wound around the pulley 25 until the retraction of the blades is complete. If the braking effect between 25a and 37 persists after the retraction of the blades (rod 36 not released in time), the result will be a braking effect on the remaining speed of rotation of the rotor as a whole, and its stoppage earlier than without this braking effect.

It will also be evident that if the man descending with the machine or parachute momentarily depresses the rod 36 the body of the machine or parachute and therefore the man, will be partially turned.

It is also clear that the main condition for the retraction of the blades, is that the braking effect on 37 must be superior to the braking effect of the pulley 25 on 3c. Friction rings 25c may be provided on the pulley 25 for cooperation with the elements 26 and 3c.

It is evident that the invention is not limited by the devices described, and that other modifications can be utilised as long as the principles are not altered.

For example, the collective and separate brakes for the regulation of the opening of the elements can altogether be different.

The brake system for the retraction of the blades can be different, and can be effected between any part of the rotating hub or of the brake-pulley and any part of the case or body of the propeller. Other flexible connecting elements, such as metal or canvas tapes can be used, instead of the cables 27.

Also, conical surface 25a or friction segment 37 can be constituted by several strips, or a complete ring.

I claim:

1. A rotor for a rotatable wing aerial apparatus, comprising a rotatable shaft, a plurality of telescopic propeller blades mounted on said shaft to rotate therewith, a cable reel on said shaft, retractive cables connected between said reel and the tip elements of said blades, said reel being rotatable on said shaft to wind said cables thereon to retract said telescopic blades and to pay out said cables upon extension of said blades by centrifugal action when said shaft is rotated, means for holding said reel against rotation with said shaft to wind said cables thereon, manually adjustable brake means between said reel and said shaft for exerting a selected constant resistance to relative rotation between said shaft and reel, and manually adjustable brake means on the base end of each of said blades and engaging the respective cable to selectively retard the paying out of the individual cables to ensure uniform extension of said blades.

2. A rotor for a rotatable wing aerial apparatus, comprising a rotatable shaft, a plurality of telescopic propeller blades mounted on said shaft to rotate therewith, a cable reel on said shaft, retractive cables connected between said reel and the tip elements of said blades, said reel being rotatable on said shaft to wind said cables thereon to retract said telescopic blades and to pay out said cables upon extension of said blades by centrifugal action when said shaft is rotated, means for holding said reel against rotation with said shaft to wind said cables thereon, and manually adjustable brake means between said reel and said shaft for exerting a selected constant resistance to relative rotation between said shaft and reel.

3. A rotor for a rotatable wing aerial apparatus, comprising a rotatable shaft, a plurality of telescopic propeller blades mounted on said shaft to rotate therewith, a cable reel on said shaft, retractive cables connected between said reel and the tip elements of said blades, said reel being rotatable on said shaft to wind said cables thereon to retract said telescopic blades and to pay out said cables upon extension of said blades by centrifugal action when said shaft is rotated, means for holding said reel against rotation with said shaft to wind said cables thereon, and manually adjustable brake means on the base end of each of said blades and engaging the respective cable to selectively retard the paying out of the individual cables to ensure uniform extension of said blades.

VITTORIO ISACCO.

References Cited in the file of this patent

UNITED STATES PATENTS

| Number | Name | Date |
|---|---|---|
| 266,166 | Lawhead | Oct. 17, 1882 |
| 1,344,640 | Leinweber | June 29, 1920 |
| 1,478,063 | Schiesari | Dec. 18, 1923 |
| 1,969,077 | Howe | Aug. 7, 1934 |
| 2,052,781 | Lindsay | Sept. 1, 1936 |
| 2,108,245 | Ash | Feb. 15, 1938 |
| 2,163,482 | Cameron | June 20, 1939 |
| 2,364,496 | Vogel | Dec. 5, 1944 |

FOREIGN PATENTS

| Number | Country | Date |
|---|---|---|
| 531,241 | Great Britain | Jan. 1, 1941 |